(12) United States Patent
Fujita et al.

(10) Patent No.: US 8,422,584 B2
(45) Date of Patent: Apr. 16, 2013

(54) TRANSMISSION DEVICE, IMAGING DEVICE, TRANSMISSION SYSTEM, RECEIVING DEVICE, AND TRANSMISSION METHOD

(75) Inventors: George Fujita, Kanagawa (JP); Tamotsu Munakata, Kanagawa (JP); Hideaki Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 12/756,265

(22) Filed: Apr. 8, 2010

(65) Prior Publication Data

US 2010/0260244 A1 Oct. 14, 2010

(30) Foreign Application Priority Data

Apr. 14, 2009 (JP) ................................ P2009-098233

(51) Int. Cl.
*H04L 27/00* (2006.01)
(52) U.S. Cl.
USPC ............................ 375/295; 375/316; 370/343
(58) Field of Classification Search .................. 375/295, 375/267, 26, 316; 370/300, 335, 535, 343; 398/183
See application file for complete search history.

(56) References Cited

U.S. PATENT DOCUMENTS

| | | | | |
|---|---|---|---|---|
| 6,775,257 | B1* | 8/2004 | Watanabe | 370/335 |
| 7,706,349 | B2* | 4/2010 | Geile et al. | 370/343 |
| 7,746,946 | B2* | 6/2010 | Kludt et al. | 375/267 |
| 2006/0056855 | A1* | 3/2006 | Nakagawa et al. | 398/183 |
| 2006/0193348 | A1* | 8/2006 | Unno et al. | 370/535 |
| 2007/0201388 | A1* | 8/2007 | Shah et al. | 370/300 |

FOREIGN PATENT DOCUMENTS

| | | |
|---|---|---|
| JP | 10 341357 | 12/1998 |
| JP | 10-341357 | * 12/1998 |

\* cited by examiner

*Primary Examiner* — Daniel Washburn
*Assistant Examiner* — Fitwi Hailegiorgis
(74) *Attorney, Agent, or Firm* — Frommer Lawrence & Haug LLP; William S. Frommer

(57) ABSTRACT

A transmission method including the steps of: dividing an input video signal into a plurality of packets which comply with a predetermined transmission standard and preferentially selecting, as a transmission path for each of the plurality of packets, a transmission channel, to which a lower frequency band is allocated, from among the plurality of transmission channels which are allocated along a frequency axis; and modulating, by using a multicarrier modulation method, the plurality of packets and transmitting the modulated packets to a receiving device along a cable through the selected transmission channel, the cable having a transmission characteristic such that attenuation of a signal to be transmitted increases with the frequency of the signal.

11 Claims, 10 Drawing Sheets

TRANSMISSION DEVICE, IMAGING DEVICE, TRANSMISSION SYSTEM, RECEIVING DEVICE, AND TRANSMISSION METHOD

BACKGROUND OF THE INVENTION

1. Field of the Invention

The present invention relates to a transmission device, an imaging device, a transmission system, a receiving device, and a transmission method. For example, the present invention relates to a technique in which a signal is transmitted between devices by using a triax cable.

2. Description of the Related Art

In the related art, in a broadcasting station a plurality of cameras are connected to a camera control unit (referred to as CCU hereinafter) by using a cable. Then, along the cable, video signals and audio signals, which are captured by the cameras, are transmitted to the CCU. In addition, return signals used for instructions and confirmation are transmitted to the cameras from the CCU.

Usually, a triax system is adopted as a signal transmission system. According to a triax system, power, a video signal, an audio signal, a command signal, and a camera return signal can be transmitted along one cable. Usually, these signals are modulated into FM waves or AM waves and transmitted by using a frequency-division multiplex system. In addition, since the cost of a coaxial cable is relatively low, generally a coaxial cable is used as the cable used for connecting the cameras and the CCU.

On the other hand, in recent years, signals which comply with the High Definition Television (HDTV) system have become prevalent, the HDTV system being capable of transmitting a larger amount of image information than the existing National Television Standards Committee (NTSC) system or the like. Namely, it is necessary for the triax system to optimally transmit these signals.

However, according to the analog transmission system mentioned above, there is a problem in that it is difficult to maintain the transmission quality of these signals. Therefore, for example according to Japanese Unexamined Patent Application Publication No. 10-341357, a signal to be transmitted is converted into a digital signal and transmitted by using a triax system.

SUMMARY OF THE INVENTION

According to Japanese Unexamined Patent Application Publication No. 10-341357, frequency bands different from one another are allocated to transmission channels used for transmitting a video signal, an audio signal, and a command signal, respectively. For example, according to an example shown in FIG. 4 of Japanese Unexamined Patent Application Publication No. 10-341357, frequency bands are allocated, in increasing order of frequency thereof, to a control signal (command signal) channel, an incoming signal channel, an audio signal channel, and a video signal channel.

However, a coaxial cable (referred to as triax cable hereinafter) used for the triax system has a transmission characteristic such that attenuation of a signal to be transmitted increases with increase in the frequency of the signal. FIG. 12 is a diagram illustrating a relationship between the frequency and the attenuation of a signal transmitted in the coaxial cable. Then, a horizontal axis represents a frequency (MHz) and a vertical axis represents signal attenuation (dB/km). For example, when the frequency of the signal is 6 MHz, the attenuation is 18 dB. On the other hand, when the frequency of the signal is 60 MHz, the attenuation increases to 60 dB. Namely, attenuation of the signal to be transmitted increases with increase in the frequency of the signal. Accordingly, the level of the transmitted signal becomes small and tolerance for noise becomes low.

Therefore, there is a problem in that when a noise signal breaks into the signal transmitted through a channel to which a higher frequency band is allocated (the video signal in the example of Japanese Unexamined Patent Application Publication No. 10-341357), an error rate increases easily. In addition, since the transmission characteristic of the signal transmitted by wireless is different from the transmission characteristic mentioned above, the problem mentioned above is less likely to occur.

Taking the problem mentioned above into account, it is desirable to transmit, by preferentially using a channel to which a lower frequency band is allocated, the video signal to be transmitted with high quality, when the wired transmission of the signal is performed.

According to an embodiment of the present invention, signals are transmitted and received to and from a receiving device along a cable by using a transmission band in which a plurality of transmission channels are allocated along a frequency axis, the cable having a transmission characteristic such that attenuation of the signal to be transmitted increases with increase in the frequency of the signal. At this time, a multiplex processing section divides an input video signal into a plurality of packets which comply with a predetermined transmission standard, modulates the plurality of packets by using a multicarrier modulation method, and selects a transmission channel, as a transmission path for each of the plurality of packets, from among the plurality of transmission channels. In addition, a control section causes the multiplex processing section to preferentially select a transmission channel to which a lower frequency band is allocated.

Accordingly, the video signal which is divided into the plurality of transmission channels and subjected to the multicarrier modulation is transmitted by preferentially using the transmission channel, to which a lower frequency band is allocated, from among the plurality of transmission channels.

DESCRIPTION OF THE PREFERRED EMBODIMENTS

Hereinafter, a preferred embodiment of the present invention (also referred to as "the embodiment") will be described with reference to FIGS. 1 to 11.

[Example of Whole Configuration of System]

Figure 1:
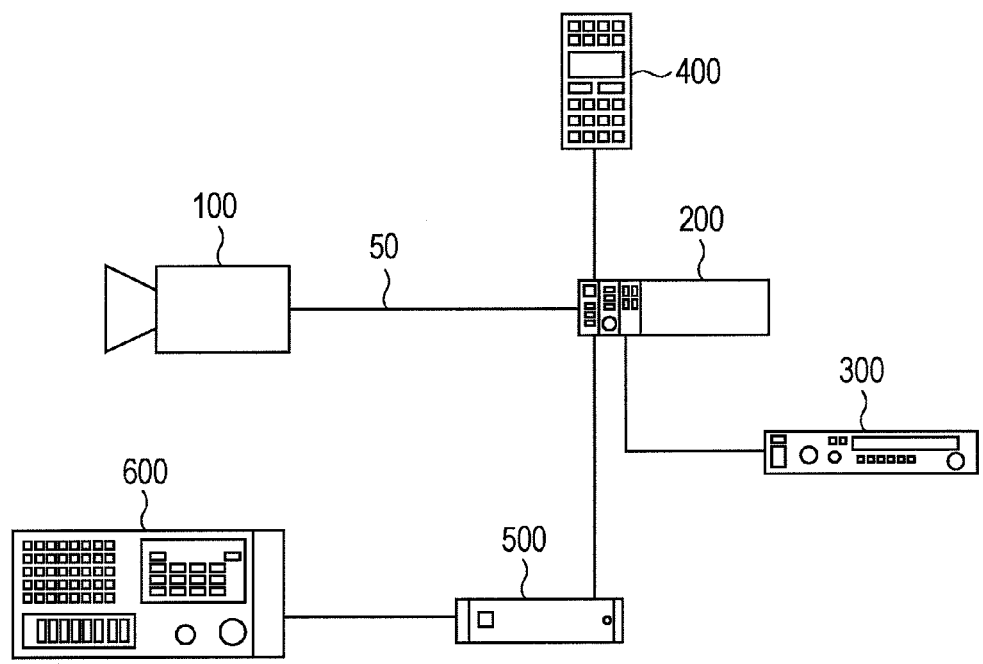
FIG. 1 is a block diagram illustrating an example of a whole configuration of a system according to an embodiment of the present invention.

FIG. 1 is a block diagram illustrating an example of a whole configuration of a system according to an embodiment of the present invention. The system includes an imaging device 100 as a transmission device and a CCU 200 as a receiving device. The imaging device 100 and the CCU 200 are connected to each other by using a triax cable 50. Then, the CCU 200 is connected to a remote control panel 400, a recording and reproducing device 300, and a camera command network unit (CNU) 500. In addition, the CNU 500 is connected to a control panel 600.

The imaging device 100 includes a lens and an imaging element (both not shown). Then, the imaging element subjects object light, which passes through the lens to the imaging element, to photoelectric conversion and generate a video signal. Along with an audio signal captured by a microphone, which is not shown, the generated video signal is transmitted to the CCU 200 along the triax cable 50.

The CCU 200 outputs the video signal, transmitted from the imaging device 100, to the recording and reproducing device 300. Then, the CCU 200 generates a return signal, a teleprompter signal, a red tally signal, and a green tally signal and transmits these signals to the imaging device 100. In addition, on the basis of operation details input directly by a user, the CCU 200 generates various control signals used for controlling the imaging device 100 and supplies these control signals to the imaging device 100. In addition, the CCU 200 transmits a control signal, input from the remote control panel 400 or the CNU 500, to the imaging device 100.

These signals transmitted between the imaging device 100 and the CCU 200 are modulated by using an orthogonal frequency-division multiplexing (OFDM) modulation method and transmitted through a plurality of channels.

The recording and reproducing device 300 records the video signal transmitted from the CCU 200, reads out and reproduces the recorded video signal, and outputs the reproduced video signal to a display device, which is not shown. On the basis of operation details input by the user, the remote control panel 400 generates a control signal used for controlling the imaging device 100 and transmits the control signal to the CNU 500.

On the basis of operation details input to the control panel 600 by the user, the CNU 500 transmits and receives control signals to and from the CCU 200. In the same way as the remote control panel 400, on the basis of operation details input by the user, the control panel 600 generates a control signal used for controlling the imaging device 100 and transmits the control signal to the CNU 500.

Figure 2:
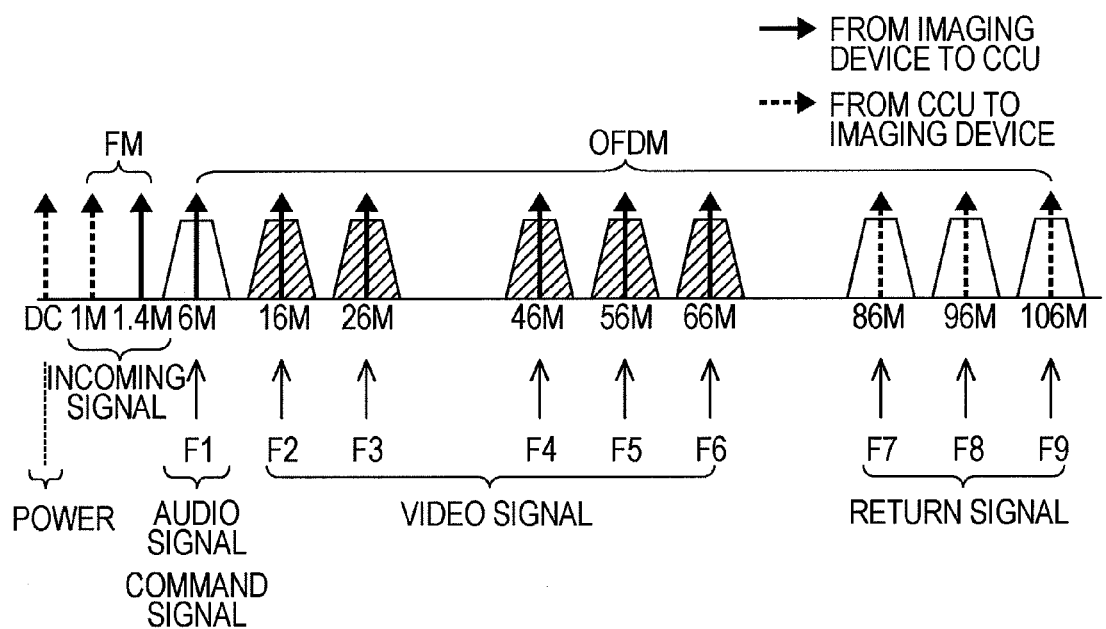
FIG. 2 is an explanatory diagram illustrating an example of frequency allocation for OFDM transmission according to the embodiment of the present invention.

Next, with reference to FIG. 2, an example of assignment of the various signals to frequency bands will be described, the various signals being transmitted and received between the imaging device 100 and the CCU 200. A horizontal axis in FIG. 2 represents frequency. In FIG. 2, center frequencies of frequency bands used for transmission from the imaging device 100 to the CCU 200 are indicated by solid arrows. Then, center frequencies of frequency bands used for transmission from the CCU 200 to the imaging device 100 are indicated by dashed arrows.

Nine channels are allocated to a transmission path used for OFDM modulated waves and represented by channels F1 to F9 in FIG. 2 respectively. Among the channels, five channels, from the channel F2 whose center frequency is 6 MHz to the channel F6 whose center frequency is 66 MHz, are used for the transmission path through which the video signal is transmitted from the imaging device 100 to the CCU 200. Namely, the video signal which is output from the imaging device 100 and has a bit rate of about 150 Mbps is transmitted to the CCU 200 through each of the five channels at the rate of 30 Mbps. Individual channels, from the channel F7 whose center frequency is 86 MHz to the channel F9 whose center frequency is 106 MHz, are used for the transmission path through which the return signal is transmitted from the CCU 200 to the imaging device 100.

[Internal Configuration of System]

Figure 3:
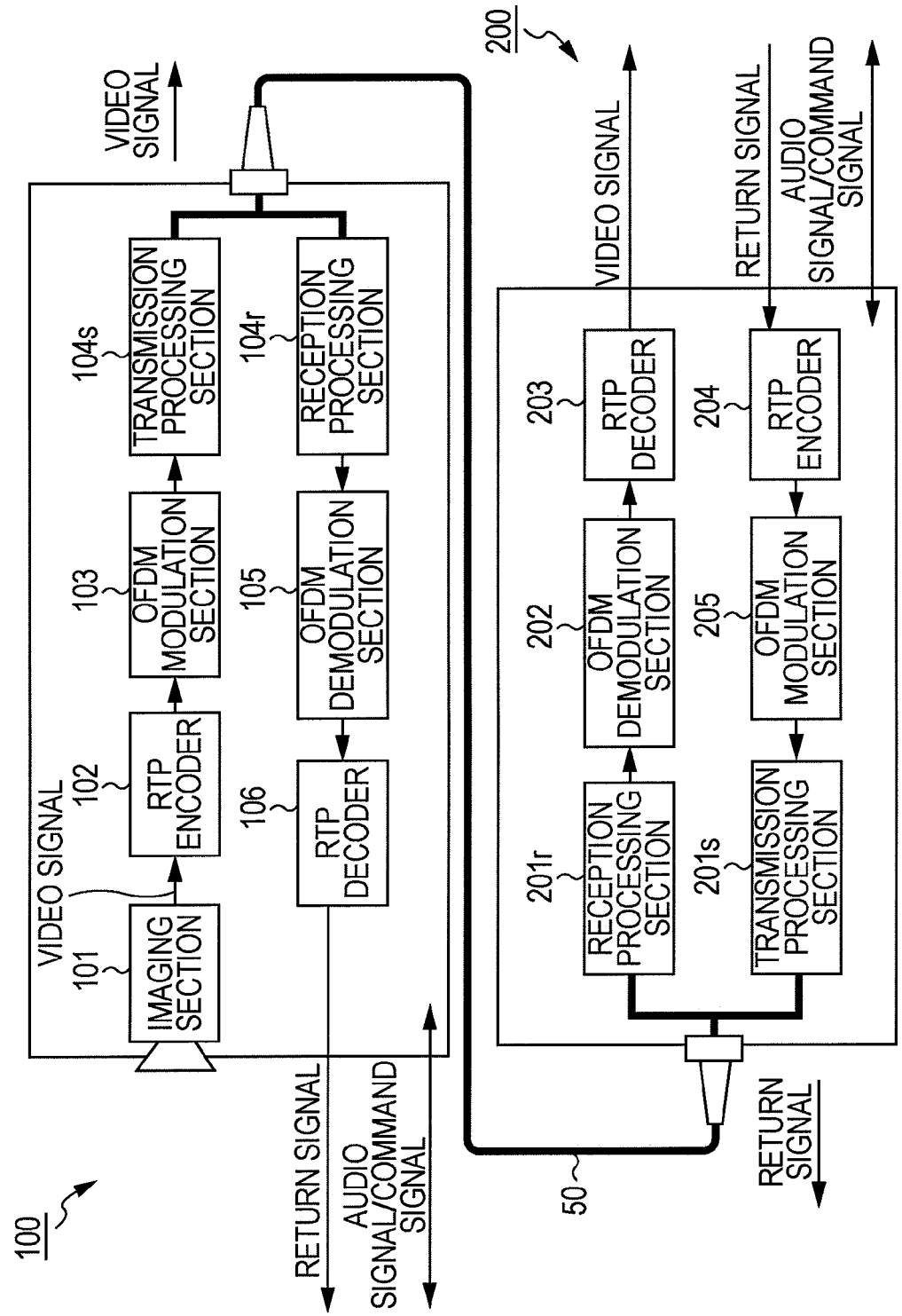
FIG. 3 is a block diagram illustrating an example of an internal configuration of the system according to the embodiment of the present invention.

FIG. 3 is a block diagram illustrating an example of an internal configuration of the system according to the embodiment. In the system shown in FIG. 3, the imaging device 100 and the CCU 200 are connected to each other by using the triax cable 50. First, the configuration of the imaging device 100 will be described. The imaging device 100 includes an imaging section 101, a Real-time Transport Protocol (RTP) encoder 102, an OFDM modulation section 103, a transmission processing section 104s, a reception processing section 104r, an OFDM demodulation section 105, and an RTP decoder 106.

The imaging section 101 digitizes the video signal obtained by capturing an object and outputs the digitized video signal to the RTP encoder 102. The RTP encoder 102 divides the input video signal into predetermined lengths and compresses the divided video signal. Then, the RTP encoder 102 generates RTP packets (first packets) by adding RTP headers.

The OFDM modulation section 103 generates TS packets (second packets) which comply with the Moving Picture Experts Group-2 Transport Stream (MPEG-2 TS) standard, by further dividing the input RTP packet into eleven parts and combining synchronization signals or the like with the parts. In addition, while the division number, eleven, is the maximum number, a lower number may be used according to the size of the input RTP packet.

Figure 4:
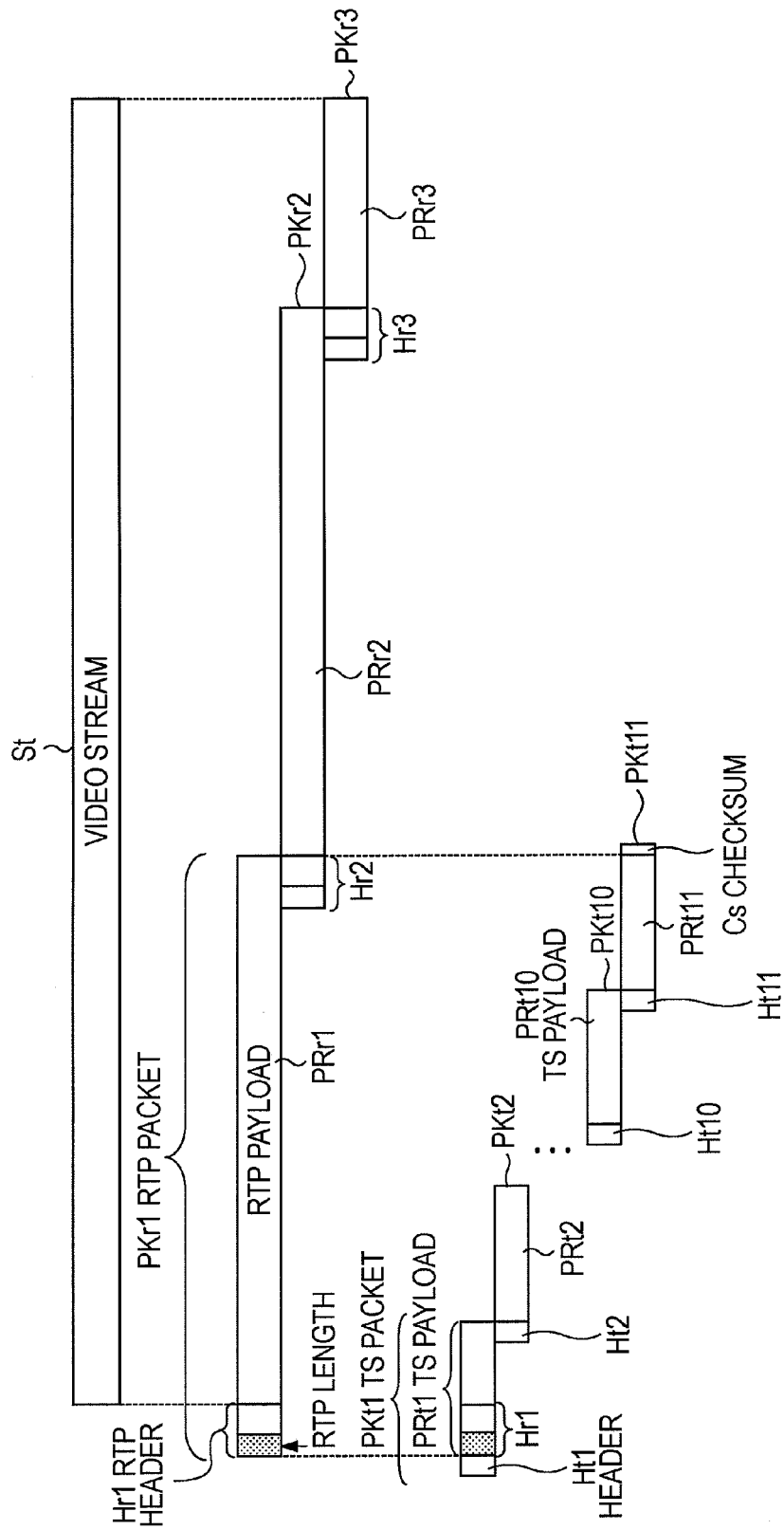
FIG. 4 is an explanatory diagram illustrating an example of a correspondence among a video stream, a TS packet, and an RTP packet according to the embodiment of the present invention.

Here, the correspondence among a video stream based on the video signal, the RTP packet, and the TS packet will be described with reference to FIG. 4. FIG. 4 illustrates a state in which the video stream indicated on the top part is divided into three RTP packets PKr1 to PKr3, and the RTP packet PKr1 is further divided into eleven TS packets PKt1 to PKt11.

The configuration of the RTP packet will be described with an example of the RTP packet PKr1. The RTP packet PKr1 includes an RTP header Hr1 and an RTP payload PRr1. Then, in the RTP header Hr1, an RTP number, which is capable of identifying the RTP packet, and length information for the RTP packet are stored.

The TS packet PKt1 generated from the RTP packet PKr1 includes a TS header Ht1 and a TS payload PRt1. The information in the RTP header Hr1 is also stored in the TS payload PRt1. Namely, the RTP number of the RTP packet from which the TS payload PRt1 derives and the length information for the RTP packet are stored in the TS payload PRt1. Then, a TS number serving as an identifier for the TS packet is stored in the TS header Ht1.

A checksum CS is added to the eleventh TS packet PKt11. Then, by using the checksum CS, the CCU 200, as a receiving side, determines whether or not the received TS packets PKt1 to PKt11 include a transmission error. In addition, in the following descriptions, when it is not necessary for the RTP packets PKr1 to PKr3 to be discriminated individually, the RTP packets PKr1 to PKr3 are simply referred to as an RTP packet PKr. In the same way, when it is not necessary for the TS packets PKt1 to PKt11 to be discriminated individually, the TS packets PKt1 to PKt11 are simply referred to as a TS packet PKt.

Returning to the description with reference to FIG. 3, the OFDM modulation section 103 further performs a processing operation for assigning the TS packet PKt to one of the channels F2 to F6 and a processing operation for modulating the TS packet PKt by using an OFDM modulation method. The processing operation for assigning the TS packet PKt, which is generated from the video signal, to one of the channels F2 to F6 is performed by selecting one channel, through which the signal has not yet been transmitted, in descending order of priorities assigned to the individual channels. The lower the frequency band allocated to the channel is, the higher the priority which is assigned to the channel is. Namely, the highest priority is assigned to the channel F2 whose center frequency is 6 MHz, and the lowest priority is assigned to the channel F6 whose center frequency is 66 MHz. Details of the channel-selection processing performed in the OFDM modulation section 103 will be described hereinafter.

After the transmission processing section 104s subjects the signal, modulated by the OFDM modulation section 103, to signal processing operations such as a signal-level adjusting operation and a processing operation for eliminating unnecessary frequency components, the transmission processing section 104s transmits the processed signal to the CCU 200 along the triax cable 50. The reception processing section 104r subjects the return signal, transmitted from the CCU 200, to analog signal processing operations such as a processing operation for eliminating unnecessary frequency components, a signal-level adjusting operation, and frequency conversion or the like. Then, the reception processing section 104r outputs the processed signal to the OFDM demodulation section 105.

The OFDM demodulation section 105 demodulates the OFDM modulated wave, subjected to the analog signal processing operations performed in the reception processing section 104r, and extracts the TS packet PKt. Then, the OFDM demodulation section 105 supplies the extracted TS packet PKt to the RTP decoder 106. The RTP decoder 106 reproduces the RTP packet PKr by using the TS packet PKt demodulated in the OFDM demodulation section 105.

In addition, while only video signal processing has been described, the audio signal and the command signal or the like are also transmitted to the CCU 200 after being processed by another processing system. In addition, the audio signal and the command signal or the like, transmitted from the CCU 200, are also extracted by other processing system.

The CCU 200 includes a reception processing section 201r, an OFDM demodulation section 202, an RTP decoder 203, an RTP encoder 204, an OFDM modulation section 205, and a transmission processing section 201s. The reception processing section 201r subjects the OFDM modulated signal, transmitted from the imaging device 100, to analog signal processing operations and outputs the processed OFDM modulated signal to the OFDM demodulation section 202.

The OFDM demodulation section 202 demodulates the OFDM modulated wave output from the reception processing section 201r and extracts the TS packet PKt. The extracted TS packet PKt is stored in a memory, not shown, in order of extraction. Then, the TS packet PKt is read out from the memory in units of RTP packet length described in the TS header Ht1 and converted into the RTP packet PKr. The RTP decoder 203 decodes the RTP packet PKr and extracts the video signal.

The RTP encoder 204 divides the return signal, generated in the CCU 200, into predetermined lengths and compresses the divided return signal. Then, the RTP encoder 204 generates RTP packets by adding RTP headers to the compressed return signal. The OFDM modulation section 205 generates TS packets PKt by further dividing the input RTP packet PKr into eleven parts and combining synchronization signals or the like with the parts. The transmission processing section 201s transmits the TS packet PKt, modulated in the OFDM modulation section 205, to the imaging device 100 along the triax cable 50. The channels F7 to F9 shown in FIG. 2 are used for OFDM transmission from the CCU 200 to the imaging device 100.

[Internal Configuration of OFDM Modulation Section in Imaging Device]

Figure 5:
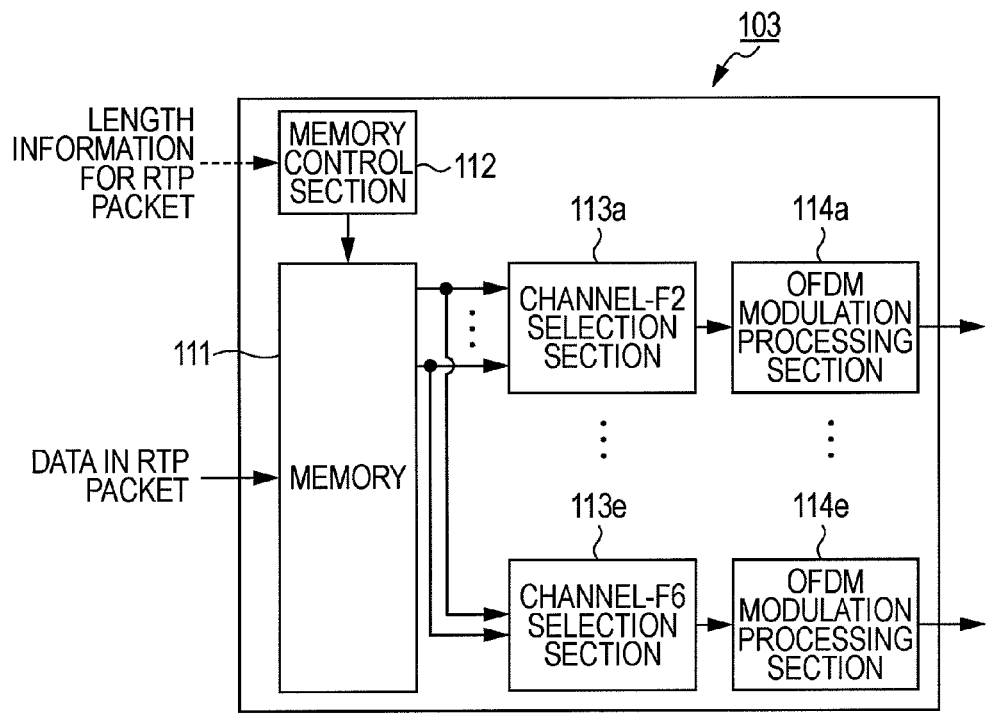
FIG. 5 is a block diagram illustrating an example of an internal configuration of an OFDM modulation section according to the embodiment of the present invention.

Next, an internal configuration of the OFDM modulation section 103 in the imaging device 100 will be described with reference to FIG. 5. The OFDM modulation section 103 includes a memory 111 used for storing data included in the RTP packet PKr supplied from the RTP encoder 102 (refer to FIG. 3) and a memory control section 112. The memory 111 includes a dual port random access memory (RAM) or the like and sequentially stores the input RTP packet PKr in the manner of a ring buffer.

The memory control section 112 controls reading and writing the RTP packet PKr from and to the memory 111. In the memory control section 112, occupancy states of the channels F2 to F6 (refer to FIG. 2) are managed by using the values of flags (referred to as busy flags hereinafter). Then, when any one of channels F2 to F6 is occupied (in signal transmission), a corresponding busy flag is put into an on-state. In addition, when any one of channels F2 to F6 is free, a corresponding busy flag is put into an off-state. In addition, the memory control section 112 performs the control of loading the TS packet PKt onto one channel selected from among the channels F whose busy flags are set to off-states, in descending order of priorities assigned to the channels F.

Specifically, when data is stored in one of data areas in the memory 111, the individual data areas corresponding to individual channels F, the corresponding busy flag is put into an on-state. Then, when the readout of data from the memory 111 (reloading data into a TS packet Pkt) is completed, the corresponding busy flag is put into an off-state. The data-storage situation of the data area in the memory 111 is determined on the basis of the length information for the RTP packet PKr, which is included in the RTP header Hr, and information relating to time taken for reading and writing data from and to the memory 111.

The OFDM modulation section 103 further includes a channel-F2 selection section 113a to a channel-F6 selection section 113e, and an OFDM modulation processing section 114a to an OFDM modulation processing section 114e. The channel-F2 selection section 113a to channel-F6 selection section 113e perform processing operations for assigning TS packets PKt read out from the memory 111 to the channel F2 to channel F6, respectively. Namely, the channel-F2 selection section 113a assigns a TS packet PKt to the channel F2, and the channel-F2 selection section 113b assigns a TS packet PKt to the channel F3. The assignment of TS packets PKt, read out from the memory 111, to the channel-F2 selection section 113a to channel-F6 selection section 113e is performed selectively. Namely, only one from among the channel-F2 selection section 113a to the channel-F6 selection section 113e is selected at one time. In other words, the memory 111 mentioned above, the memory control section 112, and the channel-F2 selection section 13a to channel-F6 selection section 113e function as a multiplexer (MUX; a multiplex processing section). At this time, it is assumed that all TS packets PKt generated from the same RTP packet PKr are assigned to the same channel F.

In addition, information relating to storage locations in the memory 111 is described in each of TS headers Ht of TS packets PKt read out from the memory 111. Then, the TS packet PKt, assigned to any one of the channel F2 to channel F6 by the channel-F2 selection section 113a to channel-F6 selection section 113, is supplied to any one of the OFDM modulation processing section 114a to OFDM modulation processing section 114e.

Figure 6:
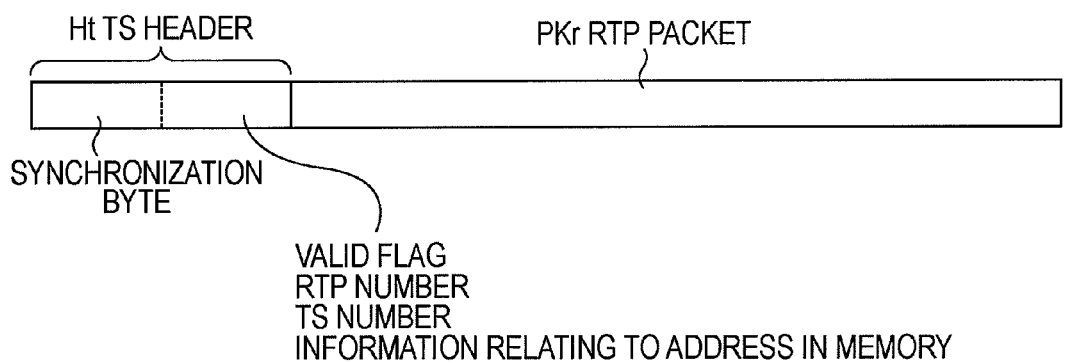
FIG. 6 is an explanatory diagram illustrating an example of a configuration of the TS packet according to the embodiment of the present invention.

FIG. 6 illustrates an example of the configuration of the TS packet PKt read out from the memory 111. The TS header Ht of the TS packet PKt includes two bytes, and a synchronization byte is stored in the first eight bits. Then, in the next eight bits, a valid flag, an RTP number, a TS number, and information relating to a storage location (address) in the memory 111.

The valid flag is a flag which indicates whether the TS packet PKt actually stores the RTP packet PKr (VALID) or stores no RTP packet PKr (INVALID). In the TS packet PKt including no valid data, the valid flag is set to "INVALID". The data stored in the TS header Ht is used when the TS packets PKt are extracted at the CCU 200 in order of transmission.

[Example of Operation Performed in Imaging Device]

Figure 7:
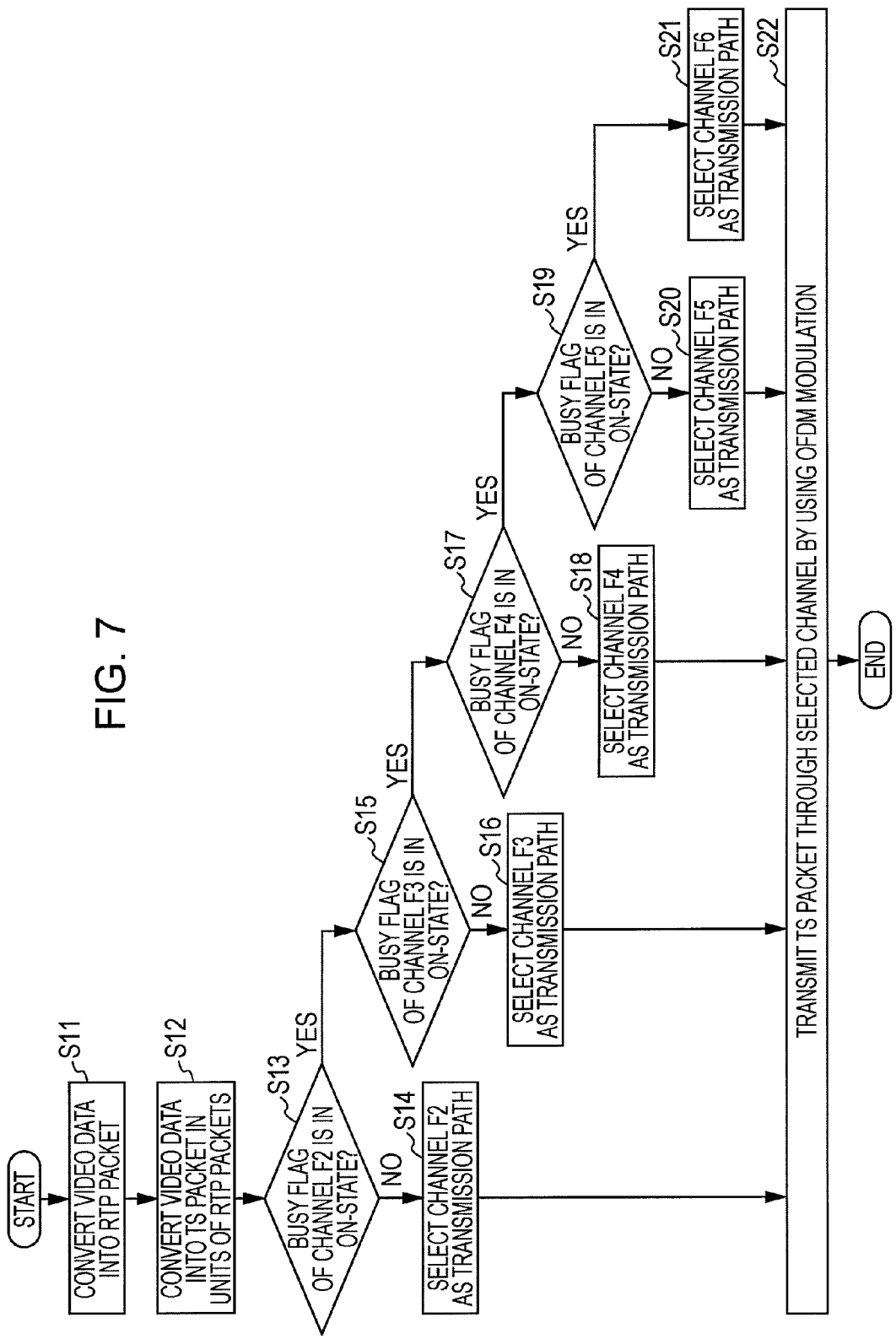
FIG. 7 is a flowchart illustrating an example of an operation performed in an imaging device according to the embodiment of the present invention.

Next, an example of a processing operation for selecting individual channels F at the time of video signal transmission performed in the imaging device 100 will be described with reference to a flowchart shown in FIG. 7. First, the video signal generated in the imaging section 101 (refer to FIG. 3) is converted into an RTP packet PKr by the RTP encoder 102 (Step S11), and divided into a plurality of TS packets PKt by the OFDM modulation section 103 (Step S12).

Next, in the memory control section 112 (refer to FIG. 5) in the OFDM modulation section 103, whether or not the busy flag of the channel F2 is in the on-state is determined (Step S13). When the busy flag of the channel F2 is in the off-state, the channel F2 is selected as a transmission path used for the TS packet PKt (Step S14).

When the busy flag of the channel F2 is in the on-state, whether or not the busy flag of the channel F3 whose priority is next to that of the channel F2 is in an on-state is determined (Step S15). When the busy flag of the channel F3 is in an off-state, the channel F3 is selected as a transmission path used for the TS packet PKt (Step S16).

When the busy flag of the channel F3 is in the on-state, whether or not the busy flag of the channel F4 is in an on-state is determined (Step S17). When the busy flag of the channel F4 is in an off-state, the channel F4 is selected as a transmission path used for the TS packet PKt (Step S18).

When the busy flag of the channel F4 is in the on-state, whether or not the busy flag of the channel F5 is in an on-state is determined (Step S19). When the busy flag of the channel F5 is in an off-state, the channel F5 is selected as a transmission path used for the TS packet PKt (Step S20). When the busy flag of the channel F5 is in the on-state, the channel F6 is selected as a transmission path used for the TS packet PKt (Step S21). Then, through the channel F selected in this way, the TS packet PKt subjected to the OFDM modulation is transmitted (Step S22).

For example, when the RTP packets PKr are input to the OFDM modulation section 103 at short intervals, that is, the pattern of the image captured by the imaging section 101 is complex, the channel F5 or the channel F6, to which a lower priority is assigned, is likely to be used. On the other hand, when the RTP packets PKr are input to the OFDM modulation section 103 at long intervals, that is, the pattern of the image captured by the imaging section 101 is simple, the channel F2 or the channel F3, to which a higher priority is assigned, is likely to be used. Namely, only channels F to which lower frequency bands are allocated are used.

Figure 8:
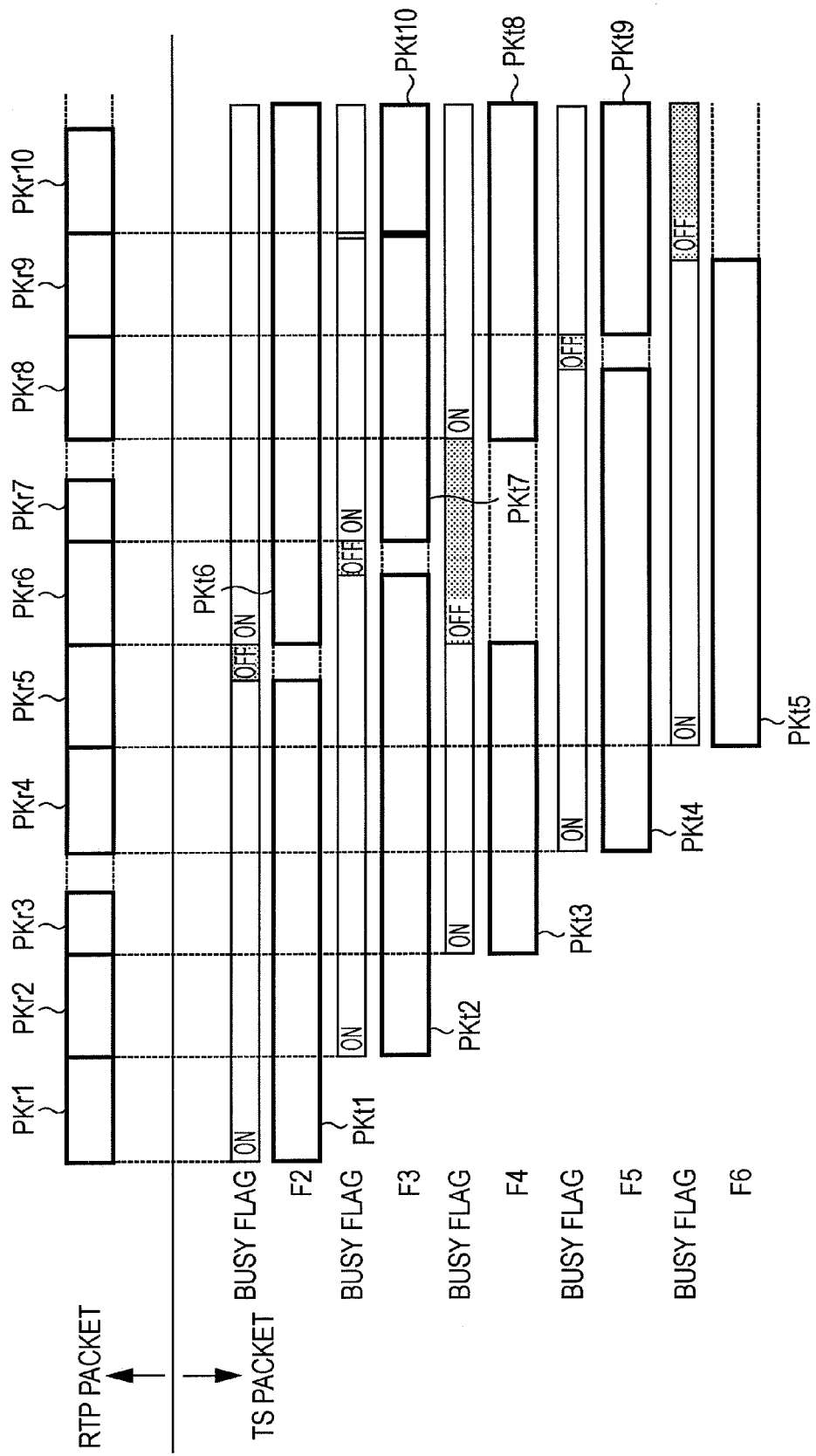
FIG. 8 is an explanatory diagram illustrating an example (1) of selection of transmission channels according to the embodiment of the present invention.
Figure 9:
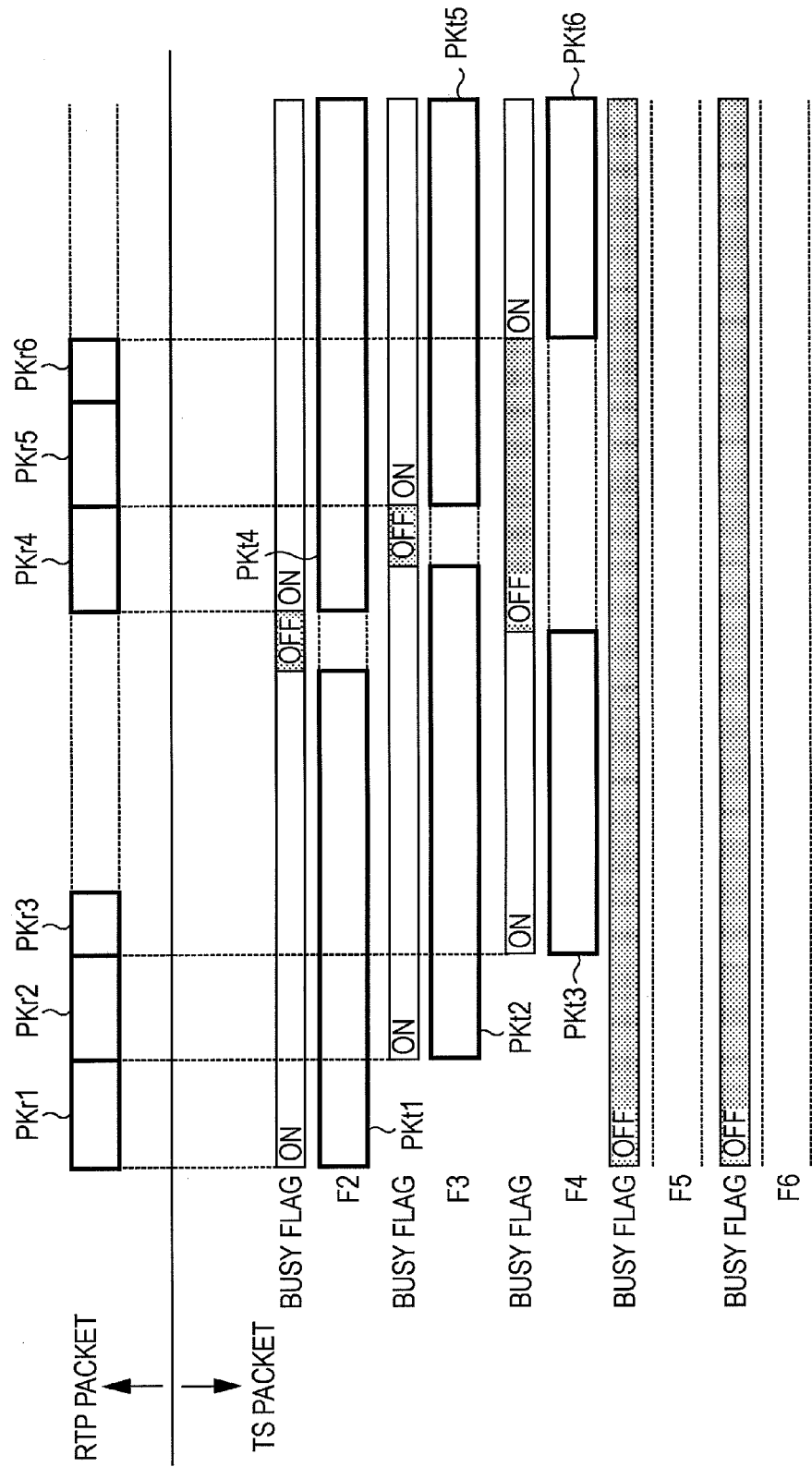
FIG. 9 is an explanatory diagram illustrating the example (1) of selection of transmission channels according to the embodiment of the present invention.

FIG. 8 illustrates an example of the former case (the pattern of the image is complex), and FIG. 9 illustrates an example of the latter case (the pattern of the image is simple). In FIGS. 8 and 9, horizontal axes represent time. The RTP packets PKr input to the OFDM modulation section 103 are indicated on the top part, and on from the second part to the bottom part, the transmission states of the individual signals transmitted through the channels F2 to F6 are indicated along with the states of the corresponding busy flags.

In FIG. 8, at the time when the TS packet PKt1 generated from the RTP packet PKr1 is loaded onto the channel F2, the busy flag of the channel F2 is put into the on-state and continues to be in the on-state until after the transmission through the channel F2 is completed. Also at the time when the next RTP packet PKr2 is input, the busy flag of the channel F2 is in the on-state. Therefore, the busy flag of the channel F3 whose priority is next to the priority of the channel F2 is checked.

Since the busy flag of the channel F3 is in the on-state, the TS packet PKt2 generated from the RTP packet PKr2 is loaded onto the channel F3. Since the same judgment is performed for the following packets, the TS packet PKt3 is loaded onto the channel F4, the TS packet PKt4 is loaded onto the channel F5, and the TS packet PKt5 is loaded onto the channel F6.

Since, at the timing when the next RTP packet PKr6 is input, the busy flag of the channel F2 to which the highest priority is assigned is in the off-state, the TS packet PKt6 generated from the RTP packet PKr6 is loaded onto the channel F2. Then, the TS packet PKt7 generated from the RTP packet PKr7 is loaded onto the channel F3, the TS packet PKt8 is loaded onto the channel F4, and the TS packet PKt9 is loaded onto the channel F5.

Since, at the timing when the next RTP packet PKr10 is input, the busy flag of the channel F2 to which the highest priority is assigned is in the on-state, the channel F3 whose priority is next to that of the channel F2 and busy flag is in the off-state is selected.

In this way, the TS packet PKt generated from the RTP packet PKr is loaded onto the channel F whose priority is highest among the channels F whose busy flags are in off-states at the timing when the RTP packet PKr is input. Namely, the channel F is selected as a transmission path, in descending order of priorities from a lower frequency band to which higher priority is assigned to a higher frequency band to which lower priority is assigned. In the example shown in FIG. 8, since the RTP packets PKr are input intermittently, also a channel (F5 or F6) allocated to a higher frequency band to which lower priority is assigned is selected. However, a channel (F2 or F3) allocated to a lower frequency band to which higher priority is assigned is more likely to be selected as a transmission path.

Also in the example shown in FIG. 9, the TS packet PKt1 generated from the RTP packet PKr1 first input is loaded onto the channel F2 to which the highest priority is assigned. Since, at the timing when the RTP packet PKr2 is input next, the busy flag of the channel F2 is still in the on-state, the channel F3 whose priority is next to that of the channel F2 and busy flag is in the off-state is selected. As a result of the same judgment performed, the TS packet PKt3 generated from the next RTP packet PKr3 is loaded onto the channel F4.

Since, at the timing when the next RTP packet PKr4 is input, the busy flag of the channel F2 to which the highest priority is assigned is in the off-state, the TS packet PKt4 generated from the RTP packet PKr4 is loaded onto the channel F2. Even though the busy flag of the channel F5 or F6 is in the off-state, at this time the channel is not selected because the priority of the channel F5 or F6 is lower than that of the channel 2.

while, at the timing when the next RTP packet PKr5 is input, the busy flag of the channel F2 to which the highest priority is assigned is in the on-state, the busy flag of the channel F3 whose priority is next to that of the channel F2 is in the off-state. Therefore, the channel F3 is selected as a transmission path used for the TS packet PKt5 generated from the RTP packet PKr5.

At the timing when the next RTP packet PKr6 is input, the busy flag of the channel F2 to which the highest priority is assigned and the busy flag of the channel F3 whose priority is next to that of the channel F2 are in the on-states, and the busy flag of the channel F4 whose priority is next to that of the channel F3 is in the off-state. Therefore, the TS packet PKt6 generated from the RTP packet PKr6 is loaded onto the channel F4.

In this way, when the RTP packets PKr are input at long intervals, that is, the pattern of the image captured by the imaging section 101 is simple, channels allocated to higher frequency bands to which lower priority is assigned are not used but only channels allocated to lower frequency bands to which higher priority is assigned are used for transmission. Since usually the RTP packets PKr are not likely to be transmitted at short intervals as shown in FIG. 8, only channels allocated to lower frequency bands are used as a transmission path.

[Example of Operation Performed in CCU]

Next, an example of an operation performed at the time of video signal reception in the CCU 200 will be described with reference to a flowchart shown in FIG. 10 and an explanatory diagram shown in FIG. 11.

Figure 10:
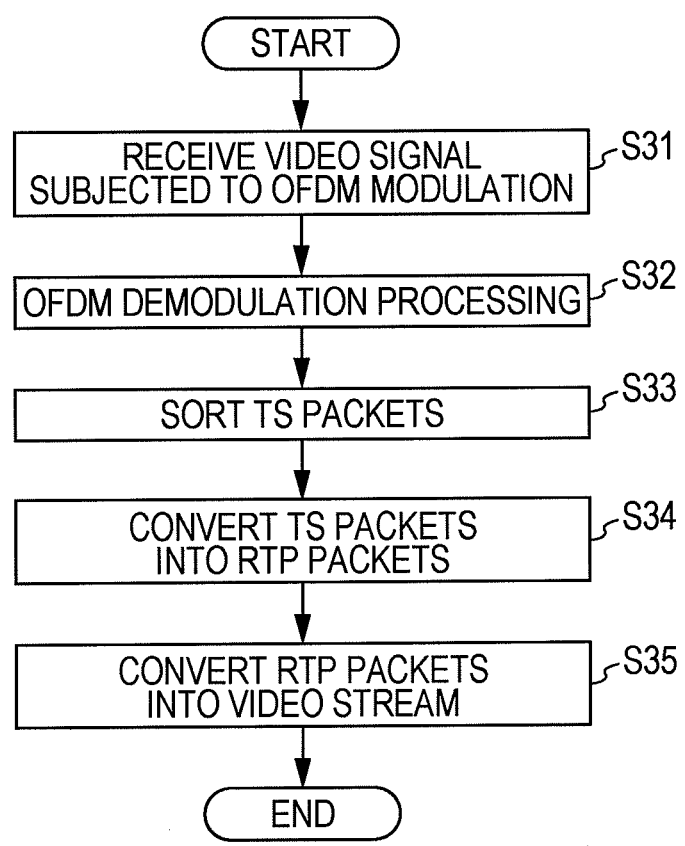
FIG. 10 is a flowchart illustrating an example of an operation performed in a CCU according to the embodiment of the present invention.

In FIG. 10, when first the video signal, which is subjected to OFDM modulation and transmitted from the imaging device 100, is received in the CCU 200 (Step S31), the OFDM demodulation section 202 performs an OFDM demodulation processing operation and extracts TS packets PKt (Step S32). The extracted TS packets PKt are temporarily stored in a memory, not shown, in order of extraction.

Next, the TS packets are sorted on the basis of the TS numbers, the RTP numbers, and the information relating to addresses in the memory 111 (refer to FIG. 5), which are described in the TS headers Ht (refer to FIG. 6) of the extracted TS packets PKt (Step S33).

Next, the sorted TS packets are individually read out in units of the length of the RTP packet PKr (refer to FIG. 4) and converted into the RTP packets PKr (Step S34). Then, the RTP packets PKr are converted into the video stream including the video signal (Step S35).

Figure 11:
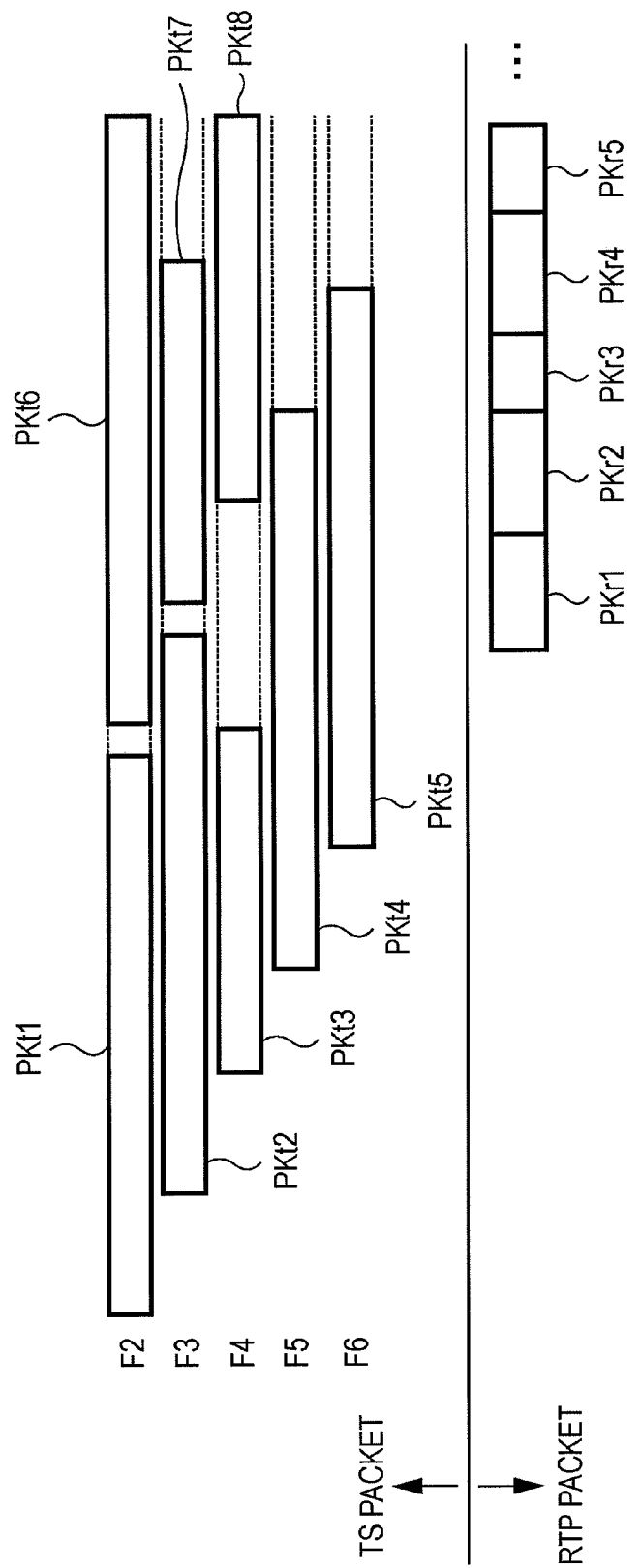
FIG. 11 is an explanatory diagram illustrating an example of RTP packet reproduction performed in the CCU according to the embodiment of the present invention.

FIG. 11 is a diagram illustrating how the OFDM demodulation section 202 in the CCU 200 reproduces the RTP packets PKr from the TS packets PKt transmitted by using the channels F2 to F6. A horizontal axis of the FIG. 11 represents time. The first line to the fifth line show transmission states of signals transmitted through the channels F2 to F6. Then, the sixth line shows the RTP packets PKr reproduced from the received TS packets PKt.

As shown in FIG. 11, the TS packet PKt1 transmitted from the imaging device 100 is transmitted through the channel F2, and the TS packet PKt2 is transmitted through the channel F3. In addition, the TS packet PKt3 is transmitted through the channel F4, the TS packet PKt4 is transmitted through the channel F5, and the TS packet PKt5 is transmitted through the channel F6.

In the OFDM demodulation section 202 in the CCU 200, TS packets PKt are extracted in the same order, as order of transmission, on the basis of various types of information, which is described in the TS headers Ht of the individual TS packets PKt, and length information for the PTR packets, which is described in payloads. Then, the extracted TS packets PKt are individually converted into the RTP packets PKr. As a result, as shown in FIG. 11, the RTP packets PKr1 to PKr5 are reproduced from the TS packets PKt1 to PKt5 transmitted through the individual channels F, in the same order as the order of transmission.

Effect of Embodiment

According to the embodiment mentioned above, one channel, through which the signal has not yet been transmitted, is selected among the channels F2 to F6 used for OFDM transmission, in descending order of priorities from a lower frequency band to which higher priority is assigned to a higher frequency band to which lower priority is assigned. Accordingly, a channel allocated to a lower frequency band to which higher priority is assigned is more likely to be selected as a transmission path.

Figure 12:
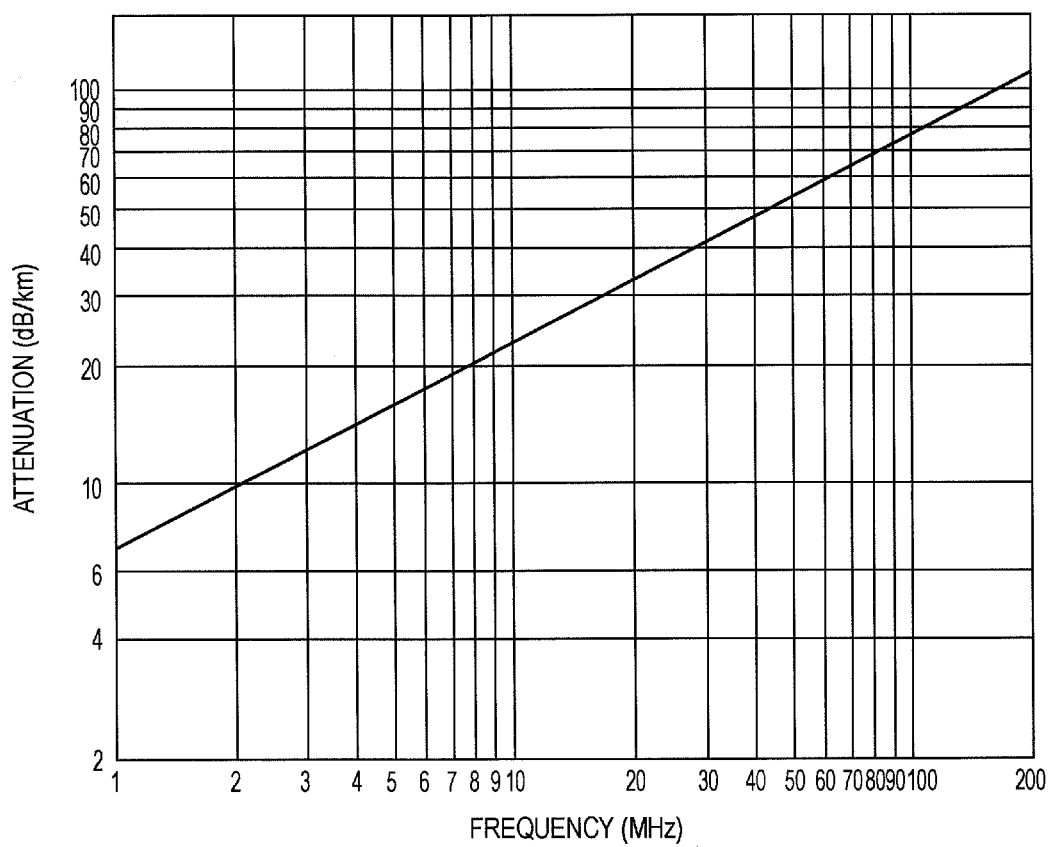
FIG. 12 is a graph illustrating a transmission characteristic of a coaxial cable of the related art.

In addition, according to the transmission characteristic of the triax cable 50 as shown in FIG. 12, it is notable that attenuation of the signal to be transmitted increases with increase in the frequency of the signal. Namely, when a noise signal breaks into the largely-attenuated signal, an error rate increases. According to the embodiment, since channels allocated to higher frequency bands are less likely to be used, an error rate can be reduced. Namely, tolerance for disturbance in a transmission system can be increased.

Accordingly, even when a signal such as a HDTV signal including a larger amount of image information is transmitted, a transmission channel to which a lower frequency band is allocated is selected preferentially. Therefore, the high transmission quality of the signal can be maintained.

In addition, according to the embodiment mentioned above, since five channels, the channels F2 to F6, are used as the transmission path for the video signal, data transmission time can be shortened compared to the case where only one channel F is provided for the transmission path.

Modified Embodiment

In addition, while the five channels are used for transmitting the video signal in the embodiment mentioned above, the transmission of the video signal is not limited to this case. According to the amount of information included in the transmitted signal or a necessary transmission rate, a number other than five, for example, three or six, may be adopted as the number of the channels used for the signal transmission.

In addition, while as an example the RTP packet PKr is divided into eleven TS packets PKt in the embodiment mentioned above, a division number other than eleven may be adopted for dividing the RTP packet PKr.

In addition, while, in the embodiment mentioned above, the TS packets PKt are loaded onto one channel F from the RTP packet PKr in units of the RTP packets PKr, the TS packet PKt may be reloaded onto one channel in units of the TS packets PKt. Namely, even though the TS packets PKt are generated from the same RTP packet PKr, any one of the TS packets PKt may be transmitted by switching to a channel F whose priority is higher, at the time when the busy flag of the channel F whose priority is higher.

In addition, while, in the embodiment mentioned above, as an example the transmission device according to the embodiment is applied to the imaging device 100, the transmission device may be applied to a device which does not include the imaging section 101 (refer to FIG. 3). Namely, the transmission device may be applied to other device which transmits a video signal input from the outside.

The present application contains subject matter related to that disclosed in Japanese Priority Patent Application JP 2009-098233 filed in the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device comprising:
a transmitting and receiving section configured to transmit and receive signals to and from a receiving device along a cable by using a transmission band in which a plurality of transmission channels are allocated along a frequency axis, the cable having a transmission characteristic such that attenuation of the signal to be transmitted increases with the frequency of the signal;
a multiplex processing section configured to divide an input video signal into a plurality of packets which comply with a predetermined transmission standard and select a transmission channel, as a transmission path for each of the plurality of packets, from among the plurality of transmission channels;
a control section configured to cause the multiplex processing section to select a transmission channel,
wherein a transmission channel to which a lower frequency band is allocated is preferentially selected;
a modulation section configured to modulate, by using a multicarrier modulation method, the plurality of packets to each of which one of the plurality of transmission channels is allocated and to output the modulated packets to the transmitting and receiving section, and
a first packet generation section configured to divide the input video signal into first packets, the first packets each being divided into second packets which are the plurality of packets and being transmission units used for transmitting data to device,
wherein the cable is a triax cable, the multicarrier modulation method is an OFDM (Orthogonal Frequency-Division Multiplexing) modulation method, the predetermined transmission standard corresponds to a MPEG-2 (Moving Picture Experts Group-2) system, the first packets are RTP (Real-time Transport Protocol) packets, and the second packets are TS (Transport Stream) packets.

2. The transmission device according to claim 1, wherein among the plurality of transmission channels, the highest priority is assigned to a transmission channel to which the lowest frequency band is allocated and the lowest priority is assigned to a transmission channel to which the highest frequency band is allocated, and
the control section causes the multiplex processing section to select the transmission channels, through which a signal has not yet been transmitted, in descending order of priority from the transmission channel to which the highest priority is assigned.

3. The transmission device according to claim 2,
wherein on the basis of length information for the first packet, the length information being described in a header area of the first packet, the control section controls selection of the transmission channel so that each of the second packets which belong to the same first packet is transmitted through the same transmission channel.

4. The transmission device according to claim 3, wherein the multiplex processing section includes a memory configured to store the second packets in order of input,
the control section allocates the transmission channels, which are selected as transmission paths, for the second packets read out from the memory, and
the control section describes storage location information of the second packets stored in the memory in a header area of each of the second packets to be transmitted to the receiving device through the transmission channel.

5. The transmission device according to claim 4, wherein on the basis of the length information for the first packets, the length information being described in the header areas of the first packets supplied from the first packet generation section, the control section determines whether or not the signal is being transmitted through each of the plurality of transmission channels.

6. The transmission device according to claim 5, wherein the control section grasps a correspondence between the TS packets and the RTP packets on the basis of identification numbers for the RTP packets, the identification numbers being described in the header areas of the TS packets.

7. The transmission device according to claim 2, wherein the control section performs control so as to cause selection of the transmission channel to be switched in units of the second packets.

8. An imaging device comprising:
an image pickup section configured to subject object light to photoelectric conversion and generate a video signal;
a transmitting and receiving section configured to transmit and receive signals to and from a receiving device along a cable by using a transmission band in which a plurality of transmission channels are allocated along a frequency axis, the cable having a transmission characteristic such that attenuation of the signal to be transmitted increases with the frequency of the signal;
a multiplex processing section configured to divide an input video signal into a plurality of packets which comply with a predetermined transmission standard and select a transmission channel, as a transmission path for each of the plurality of packets, from among the plurality of transmission channels;
a control section configured to cause the multiplex processing section to select a transmission channel, wherein a transmission channel to which a lower frequency band is allocated is preferentially selected;

a modulation section configured to modulate, by using a multicarrier modulation method, the plurality of packets to each of which one of the plurality of transmission channels is allocated and to output the modulated packets to the transmitting and receiving section; and a first packet generation section configured to divide the input video signal into first packets, the first packets each being divided into second packets which are the plurality of packets and being transmission units used for transmitting data to the receiving device, wherein the cable is a triax cable, the multicarrier modulation method is an OFDM (Orthogonal Frequency-Division Multiplexing) modulation method, the predetermined transmission standard corresponds to a MPEG-2 (Moving Picture Experts Group-2) system, the first packets are RTP (Real-time Transport Protocol) packets, and the second packets are TS (Transport Stream) packets.

9. A transmission system comprising:

a transmission device configured to include a transmitting and receiving section configured to transmit and receive signals to and from a receiving device along a cable by using a transmission band in which a plurality of transmission channels are allocated along a frequency axis, the cable having a transmission characteristic such that attenuation of the signal to be transmitted increases with the frequency of the signal, a multiplex processing section configured to divide an input video signal into a plurality of packets which comply with a predetermined transmission standard and select a transmission channel, as a transmission path for each of the plurality of packets, from among the plurality of transmission channels, a control section configured to cause the multiplex processing section to select a transmission channel, wherein a transmission channel to which a lower frequency band is allocated is preferentially selected, and a modulation section configured to modulate, by using a multicarrier modulation method, the plurality of packets to each of which one of the plurality of transmission channels is allocated and to output the modulated packets to the transmitting and receiving section; and a receiving device configured to include a receiving section configured to receive the signal transmitted from the transmitting and receiving section in the transmission device, a demodulation section configured to demodulate the signal received by the receiving section and restore the video signal by sorting individual packets obtained by the demodulation into order in which the individual packets are transmitted from the transmission device; and a first packet generation section configured to divide the input video signal into first packets, the first packets each being divided into second packets which are the plurality of packets and being transmission units used for transmitting data the receiving device, wherein the cable is a triax cable, the multicarrier modulation method is an OFDM (Orthogonal Frequency-Division Multiplexing) modulation method, the predetermined transmission standard corresponds to a MPEG-2 (Moving Picture Experts Group-2) system, the first packets are RTP (Real-time Transport Protocol) packets and the second packets are TS (Transport Stream) packets.

10. A receiving device comprising:

a receiving section configured to receive individual packets into a predetermined number of which a video signal is divided, the individual packets being modulated by using a multicarrier modulation method and transmitted along a cable through individual transmission channels, wherein a transmission channel to which a lower frequency band is allocated is preferentially selected from among a plurality of transmission channels allocated along a frequency axis, the cable having a transmission characteristic such that attenuation of the signal to be transmitted increases with the frequency of the signal; and a demodulation section configured to demodulate the signal received by the receiving section and restore the video signal by sorting the individual packets obtained by the demodulation into order in which the individual packets are transmitted from the transmission device, wherein an input video signal is divided into a plurality of packets which comply with predetermined transmission standard, the input video signal being divided into first packets, the first packets each being divided into second packets which are the plurality of packets and being transmission units used for transmitting data to the receiving device, wherein the cable is a triax cable, the multicarrier modulation method is an OFDM (Orthogonal Frequency-Division Multiplexing) modulation method, the predetermined transmission standard corresponds to a MPEG-2 (Moving Picture Experts Group-2) system, the first packets are RTP (Real-time Transport Protocol) packets, and the second packets are TS (Transport Stream) ackets.

11. A transmission method comprising the steps of:

dividing an input video signal into a plurality of packets which comply with a predetermined transmission standard, wherein a transmission channel to which a lower frequency band is allocated is preferentially selected as a transmission path for each of the plurality of packets, from among the plurality of transmission channels which are allocated along a frequency axis;

modulating, by using a multicarrier modulation method, the plurality of packets and transmitting the modulated packets to a receiving device along a cable through the selected transmission channel, the cable having a transmission characteristic such that attenuation of a signal to be transmitted increases with the frequency of the signal; and dividing the input video signal into first packets, the first packets each being divided into second packets which are the plurality of packets and being transmission units used for transmitting data to the receiving device, wherein the cable is a triax cable, the multicarrier modulation method is an OFDM (Orthogonal Frequency-Division Multiplexing) modulation method, the predetermined transmission standard corresponds to a MPEG-2 (Moving Picture Experts Group-2) system, the first packets are RTP (Real-time Transport Protocol) packets, and the second packets are TS (Transport Stream) packets.

* * * * *